United States Patent [19]
Warner et al.

[11] Patent Number: 5,895,612
[45] Date of Patent: Apr. 20, 1999

[54] METHOD OF MAKING ABRADING TOOLS

[75] Inventors: Rueben Brown Warner, Westlake; Joseph P. Gaser, Euclid, both of Ohio

[73] Assignee: Jason Incorporated, Cleveland, Ohio

[21] Appl. No.: 08/585,286

[22] Filed: Jan. 11, 1996

[51] Int. Cl.[6] .......................... B29C 44/06; B29C 44/12
[52] U.S. Cl. ................ 264/46.4; 264/46.6; 264/46.9; 264/243; 264/271.1
[58] Field of Search .................... 523/149; 300/21; 264/46.6, 46.4, 243, 271.1, 46.9

[56] References Cited

U.S. PATENT DOCUMENTS

| | | | |
|---|---|---|---|
| 2,292,261 | 8/1942 | Albertson | 523/149 |
| 3,404,422 | 10/1968 | Warner | 300/21 |
| 3,641,610 | 2/1972 | Lewis, Jr. | 300/21 |
| 3,643,282 | 2/1972 | Lechene et al. | 300/21 |
| 3,839,763 | 10/1974 | Gould | 300/21 |
| 3,907,729 | 9/1975 | Burkey et al. | 523/149 |
| 4,054,425 | 10/1977 | Sherman | 264/279.1 |
| 4,133,147 | 1/1979 | Swift, Jr. | 451/532 |
| 4,334,563 | 6/1982 | Epel et al. | 30/308.1 |
| 4,421,870 | 12/1983 | Stutz et al. | 521/160 |
| 4,581,187 | 4/1986 | Sullivan et al. | 264/46.4 |
| 4,637,660 | 1/1987 | Weihrauch | 300/21 |
| 4,837,245 | 6/1989 | Streu et al. | 521/117 |
| 4,892,698 | 1/1990 | Weihrauch | 264/275 |
| 5,129,191 | 7/1992 | Warner et al. | 451/466 |
| 5,182,166 | 1/1993 | Burton et al. | 523/149 |
| 5,321,919 | 6/1994 | Scheider et al. | 451/466 |
| 5,441,333 | 8/1995 | Kim | 300/21 |

*Primary Examiner*—Allan R. Kuhns
*Attorney, Agent, or Firm*—Renner, Otto, Boisselle, Sklar

[57] ABSTRACT

An abrasive tool includes a rotatable hub from which extends a bundle of plastic abrasive monofilaments. The bundle has a high filament count and each filament includes a substantial amount of abrasive uniformly entrained therein. After the bundle is secured to the hub, the tool is placed in a mold completely enclosing at least the projecting bundle and a foamable elastomer is injected into the mold to produce a light density cellular matrix bond encapsulating the filaments. The preferred plastic for the plastic monofilaments is nylon 6–12 and the preferred elastomer is a low density (2–20 lbs/cu/ft) polyurethane. The cellular matrix bond for the preferred applications upon wear does not produce a liquid phase at even high tool pressures. Radially extending enlarged coolant passages may be formed during the encapsulation and injection process step. The tool may be in disk, cup or twisted stem form.

14 Claims, 2 Drawing Sheets

METHOD OF MAKING ABRADING TOOLS

DISCLOSURE

This invention relates to abrading tools and to methods of making such tools. More particularly, the invention relates to elastomer reinforced abrasive tools particularly suitable for surface finish and edge finishing operations, and to methods and compositions for making such tools.

BACKGROUND OF THE INVENTION

In prior U.S. Pat. No. 4,945,687 and 5,046,288, there is disclosed a rotary finishing tool where monofilaments such as extruded nylon containing abrasive grains are used as reinforcement in a relatively heavy foam elastomer which contains at least one grit size type of abrasive and preferably two grit size types, one of which is relatively coarse. The foam elastomer bond has a void content of from about 5 to about 50 percent. Tools made according to such patents typically have elastomeric densities of from 20 to 50 pounds per cubic foot and higher. The inclusion of the nylon abrasive monofilaments allows the tool to be run at higher speeds. The tools of such prior patents have the characteristics of improved soft grinding wheels with the abrasive being delivered to the work primarily through the elastomer. While effective as a high speed material removal tool, such tools are not effective for surface finish and edge blending operations where the tool would run at a slower or more normal speed such as 2000 to 2500 feet per minute, and at considerably higher pressure.

Lateral distortion of an abrasive monofilament is to be expected at high working pressures. Such lateral distortion is where the tip of the monofilament is deflected to one side or the other of the plane of rotation as it engages the work. This produces a non-linear scratch pattern and reduces the efficiency of the tool. In primary metal finishing, where metal is made in bulk, usually in strip form, a straight line or generally linear scratch pattern is very important. Before subsequent operations, the strip, usually coiled, is uncoiled and run through surface finishing tool stands where both surfaces are subjected to the normal speed high pressure surface finishing operation. The strip may be quite wide and the tools span the width of the strip. The tools are usually run with coolant. In some cases, the coolant is introduced at the working face and in others, the coolant is introduced at the axis or arbor of the tool to flow radially outwardly to the working face. The coolant removes loose abrasive particles, anything worn from the tool, and anything removed from the metal. The coolant is run through a filter which takes out some of the particles, but not all. Some, mostly detritus, remains entrained in the coolant and over time, tends to clog up between the tool sections. This is particularly true if the coolant moves through the core of the tool to pass radially. This is the most effective cooling system for an abrasive nylon monofilament tool since it keeps the whole length of the monofilament at the proper temperature.

If the proper coolant flow is blocked, the plastic of the monofilament may become soft or melt and this may very quickly ruin a very expensive tool. For a wide strip, such tools may cost many thousands of dollars. Also, and perhaps more importantly, if the tool clogs, the line has to be shut down, the tool disassembled, and if the foreign material has dried, it literally has to be sand blasted to clean the tool properly.

High application pressure with plastic abrasive monofilaments rather highly compacted and with a high abrasive loading will normally generate more heat than normal. Also, high pressure tends to compact the monofilaments, and if the interstices are relied on for coolant flow, such compression tends to close any normal separation or voids. If detritus is in the coolant system and not removed by upstream filters, the tool will clog and may soon self destruct because of lack of coolant flow. While the exterior of the tool may in some cases be sand blasted to remove clogging particles, the interior interstices cannot. The clogging and heat rise may happen suddenly resulting in the destruction of the tool.

Where a high density matrix is employed, particularly one which incorporates abrasive of some coarseness, tool wear tends to form rather sizable clumps or particles. In some applications, this is not a particular problem. However, in primary metal finishing or edge blending where high pressures are employed continuous recirculated coolant is required and such high density material creates particles which can quickly clog filters or coolant flow paths which can quickly lead to expensive consequences. High density materials which have a liquid state upon erosion also tend to agglomerate other particles to form clumps, particularly when abrasive or coarse abrasive is used. Accordingly, it would be desirable to have a matrix which does not create clogging clumps as it wears away. It would also be desirable that under normal wear or erosion that the matrix material go from a solid to primarily gas, and that what particles are produced, do not create problems, due to particle size, velocity and weight or mass.

It would, accordingly, be desirable to have a low cost highly efficient surface finishing and edge blending tool which would produce a straight or generally linear scratch pattern and not be subject to clogging or coolant filter problems.

While abrasive plastic monofilaments both circular and rectangular in section have been used in a variety of tools, such monofilaments are limited in the amount of abrasive which may be entrained during extrusion. The tough plastic material provides the tensile and modular strength, and at high abrasive loading particularly with large grit size abrasive, the strength of the abrasive monofilament declines. This is particularly true in high pressure surface finishing or edge blending operations where lateral distortion or flexing is apt to occur. With high abrasive loading, abrasive monofilament breakage, fracture, and premature wear is to be expected at high working pressures. It would also be desirable to have such a tool capable of operating at such high pressures and yet have a high abrasive loading of the monofilaments, both in amount and grit size.

SUMMARY OF THE INVENTION

A rotary surface finish and edge blending tool utilizes plastic abrasive monofilaments with a normally high monofilament count so that the monofilaments are compacted and the tips form a high tip density work face. The monofilaments contain a high amount of abrasive material preferably in excess of from about 20 to about 30% by weight, uniformly dispersed throughout an extruded plastic such as nylon. The abrasive content is such that it would normally weaken the monofilament which obtains its tensile and beam strength or modulus from the extruded plastic. The tool is filled with a light density thermoplastic elastomer foam matrix which fills the interstices in the high density bundle of monofilaments and encapsulates the bundle. The matrix is preferably a light density urethane elastomer foam having a density from about 2 to about 20 pounds per cubic foot, and preferably from about 4 to about 16 pounds per cubic foot. The matrix has voids substantially in excess of about 50 percent and preferably contains little or no abrasive additive. If any additive is employed, it is a small amount of a fine grit grain size. The light density foam under wear or erosion goes from a solid to primarily a gas, and the particles produced upon wear have a size and weight or mass which does not create filtration problems which could quickly ruin a very expensive tool. The foamed light density matrix supports the abrasive monofilaments to reduce the compliance of the tool, providing a better or more straight line scratch pattern for primary metal surface finishing. In other words, even though the encapsulated monofilaments may project a substantial distance from the hub, they will be sufficiently supported and confined to act as though they had only about ⅛ inch to about 1 inch trim length. The support and reduction of lateral flexibility enables the plastic abrasive monofilaments to contain a higher abrasive loading since the matrix adds external support.

When the tool is initially constructed, it is encased in a mold or between two mold plates and the matrix is injected. Although retainers or other mechanical or adhesive means may be employed, the injected thermoplastic elastomer acts as an adhesive bond further securing the monofilaments and the hub or core. In the molding process, substantial molded radial extending coolant paths are formed which are substantially larger than paths which may easily become clogged by debris missed by the filter. The radial passages may be formed by interfitting or cooperating wall or circular face sections and the tool may be distorted or wavy circumferentially so that the abutments of the tool sections or coolant passages do not form stripes or unwanted striations in the work surface. This is primarily important in primary metal finishing.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION OF THE PREFERRED EMBODIMENTS

Figure 1:
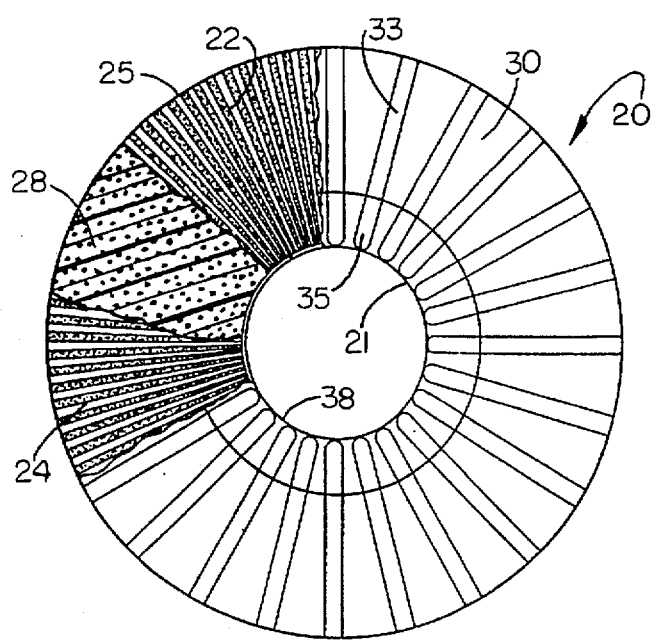
FIG. 1 is an axial elevation partially broken away and in section of a wheel tool in accordance with the present invention.
Figure 2:
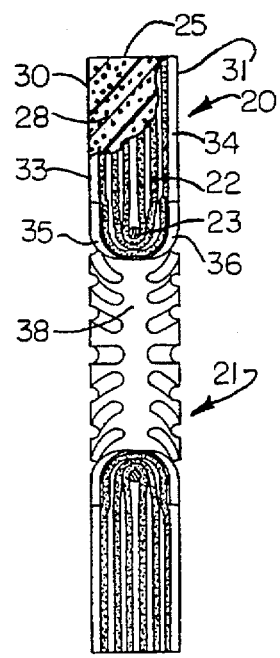
FIG. 2 is a diametral section of the tool of FIG. 1.
Figure 3:
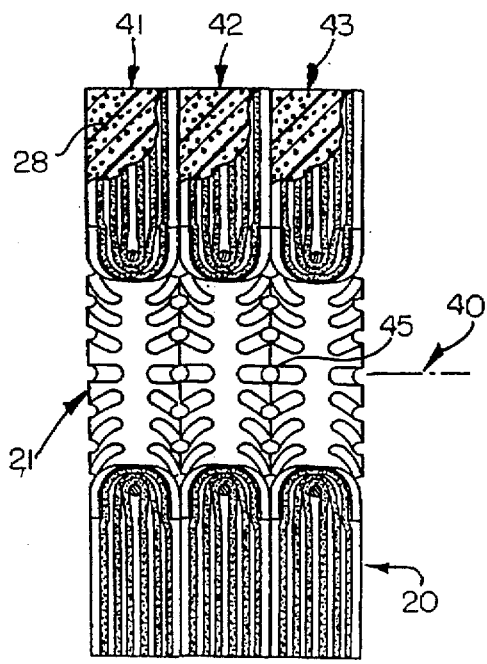
FIG. 3 is a view like FIG. 2 showing several tools stacked together for placement on a drive arbor.
Figure 4:
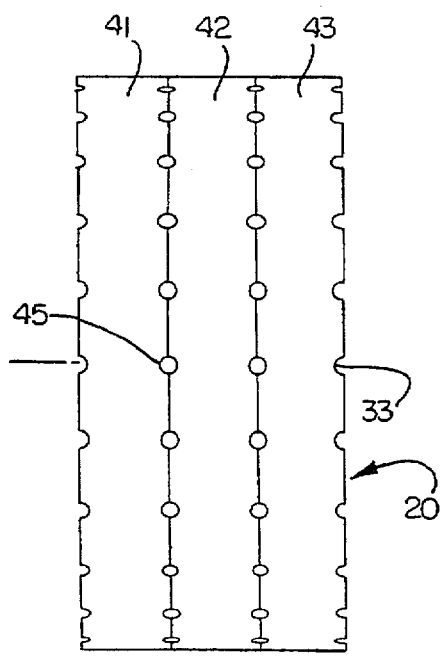
FIG. 4 is an elevation of the exterior of the stacked tools of FIG. 3.

Referring initially to FIGS. 1 and 2, there is illustrated a wheel or disk type tool in accordance with the present invention. The tool shown generally at 20 includes an annular hub 21 in which is secured a bundle of abrasive plastic monofilaments shown generally at 22. Within the hub, the abrasive plastic monofilaments extend around a ring or wire anchor 23 to project radially to form the annular array 24 with the tips of the abrasive monofilaments comprising the annular or cylindrical work face 25 of the tool. The abrasive monofilaments are preferably packed as tightly as they will go in the hub without damaging the filaments so that the monofilament count of the bundle forming the circular array is at or near its maximum for a disk type tool illustrated. It will be appreciated that the density of the monofilaments as they go around the ring anchor 23 and exit the channel shape annular hub 21 is at a maximum, and they occupy approximately 85 to 95 percent of the space available, the balance being the interstices between the monofilaments in the bundle. However, as the monofilaments exit the hub, they fan out and the spacing between the monofilaments increases. Thus, with maximum monofilament count, depending upon trim length, the interstices at or near the working face might be approximately 45 to 55 percent of the volume of the tool. The trim length is the length the monofilament projects from the edge of the hub. This monofilament count or density at the working face will be even further reduced if the monofilaments are permitted to flare or expand axially of the tool as well when they exit the hub.

It will be appreciated that the hub is designed to rotate around its axis which is normal to the plane of FIG. 1 or parallel to the plane of FIG. 2. The overall average of the filament count or percentage of volume taken up by the filaments beyond the hub is preferably in excess of 55 percent and preferably in excess of 65 percent. The compliment of 45 percent and 35 percent, respectively, is, of course, that of the interstices or voids between the monofilaments.

As illustrated in FIGS. 1 and 2, such interstices from the interior of the hub to the working face 25 are occupied by a cellular elastomer shown generally at 28 which has a relatively low density of from about 2 to about 20 lbs/cu/ft., and preferably a density of from about 4 to about 16 lbs/cu/ft. The elastomer is forced into the tool under pressure or infused completely to fill the interstices, both within and without the hub. The injection process is accomplished with the tool in a mold which confines the disk faces of the tool seen at 30 and 31, to remain essentially parallel to each other and perpendicular to the axis of the tool. This assists in maintaining a high monofilament count at the work face 25.

During the molding process, the circular faces of the disk tool are provided with an array of coolant channels beyond the hub seen at 33 and 34, and radially coextensive channels 35 and 36 in the hub. The latter channels in the hub taper out or feather out at the bight portion of the U-shape hub, or the interior indicated at 38. In the illustrated embodiment, there are approximately 26 such channels, both in the projecting filaments and in the hub. Such coolant channels or passages may thus be spaced at about 13 of 14° intervals. As seen from FIGS. 1–4, such coolant channels are of significant size, and the half round configuration thereof is designed to mate with a half round configuration of an adjoining disk to make a full round radially extending coolant passage which extends from the hollow interior of the tool to the working face.

When the tool leaves the mold, and after the cellular matrix bond 28 has cured, the projecting abrasive monofilaments are encapsulated by the cellular matrix bond and the axial disk faces including the radially extending cooling passages 33 will have a thin integument or skin even though the plastic abrasive monofilament may be exposed at the skin. The integument provides lateral support and discipline for the plastic monofilaments which keeps them from spreading significantly right or left as seen in FIG. 2 as the tool is forced against work at the tool face 25 under significant pressure. Also, even though the cellular matrix bond is essentially an open cellular structure, the skins or integuments at the axial faces formed by the mold surfaces will normally limit or impede coolant entry into such matrix except through the tool working face which, as the tool wears, will continually expose the generally open cellular structure and, more importantly, the abrasive grains entrained in the abrasive plastic monofilaments. While the working face 25 of the tool will also be provided with a skin or integument, as the tool leaves the mold, that skin or integument is soon worn away as the tool is operated or trimmed further.

The tool of FIGS. 1 and 2 is designed to be stacked or mounted on an arbor through which coolant flows such as the arbor illustrated and described in Frymier U.S. Pat. No. 5,207,032 or Nelson U.S. Pat. No. 3,109,190. The tools are stacked on the arbor on the axis indicated at 40 in FIG. 3 in side-by-side relationship seen at 41, 42 and 43. When the tools are stacked and properly aligned, the half round cooling passages mate as indicated at 45 forming a full round radially extending cooling passage extending from the arbor to the working face of the tool. The curved bight portion of the hub and the passage configuration therein indicated at 35 and 36 in effect funnels any coolant emanating from the drive arbor into such radially extending passages and centrifugal force assists in moving the coolant from the arbor to the working face of the tool. As indicated above, it will be appreciated that the tool may be of substantial axial length which may be necessary to span a strip of sheet metal in coiled form which may be in excess of a meter wide.

Figure 5:
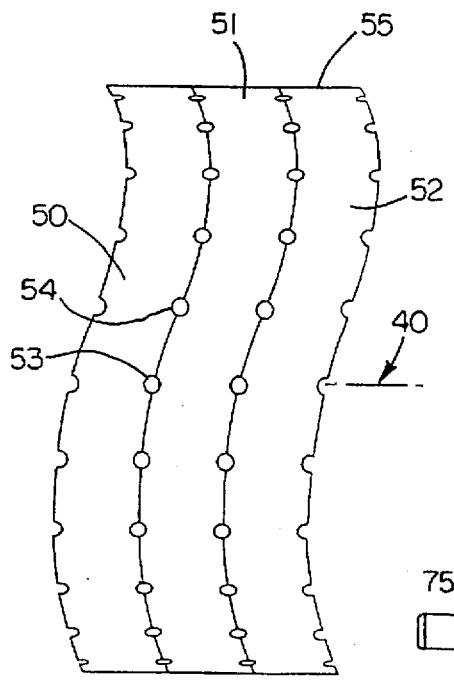
FIG. 5 is an elevation like FIG. 4 but showing circumferentially distorted or wavy tools stacked together.

If the transaxial alignment of the coolant passages creates unwanted striations in the work, the disk tools can be formed with a circumferential wavy pattern as indicated at 50, 51 and 52 in FIG. 5 so that the coolant passages 53 are not transaxially aligned. Each adjacent coolant passage such as seen at 54 is slightly axially offset from its neighbors. The circumferentially wavy tool disks can be formed in the manner illustrated in FIG. 5 by pressing in the encapsulated mold as hereinafter described and shaping the axial mold walls accordingly. The distorted disks of FIG. 5 are mounted on the axis 40 of the mandrel or arbor which extends parallel to the right circular cylindrical work face 55. The distorted configuration of the disks of FIG. 5 also has the advantage of locking the disks together for rotation as a unit. In other words, one disk cannot relatively slip with respect to the other when clamped upon an arbor.

Figure 6:
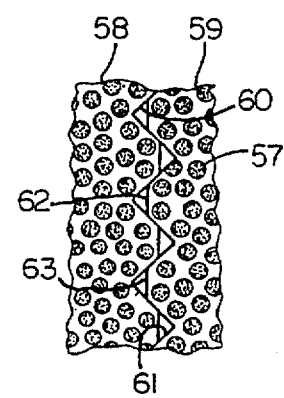
FIG. 6 is an enlarged detail of another coolant passage embodiment showing two sections interlocked together and forming radial coolant passages with the interfitting molded circular faces.

FIG. 6 illustrates the cylindrical working face 57 of two clamped together disks 58 and 59 which are provided with radially serrated axial faces seen at 60 and 61. Each serration comprises a truncated radially extending triangular ridge 62 which nests between adjacent ridges in the opposite disk tool. The truncated portion of the ridge forms a triangular radially extending cooling passage as seen at 63. It is also noted that in the embodiment of FIG. 6, the triangular cooling passages are circumferentially offset from each other as well as axially offset. The serrations also keep one disk from slipping with respect to the other.

Figure 7:
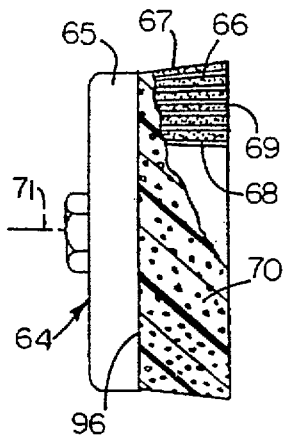
FIG. 7 is an elevational view partially in section of a cup-brush like tool in accordance with the present invention.

While the embodiments of FIGS. 1–6 illustrate generally disk or wheel type tools, it will be appreciated that the present invention may also take the form of other tool shapes. In FIG. 7, there is illustrated generally at 64 a cup-shape tool. The bundle of plastic abrasive monofilaments project from the cup hub 65 in an annular ring shown generally at 66. Both the interior and the exterior of such ring seen at 67 and 68 may be enclosed in a mold, as well as the working face 69. When the mold is closed, the tool is injected or infused with an elastomer which is permitted to foam or become cellular as indicated at 70. The low density foam, again from about 2 to about 20 lbs/cu/ft., encapsulates the projecting abrasive filaments and provides lateral support which enables the abrasive filaments to contain more abrasive than would otherwise be the case, and also present a more orderly or disciplined scratch pattern limiting the deflection of the working tips of the filaments at the face. The tool of FIG. 7 is rotated axially on a shaft or arbor, the axis of which is shown at 71. The abrasive filaments extend generally parallel to the axis of rotation.

Figure 8:
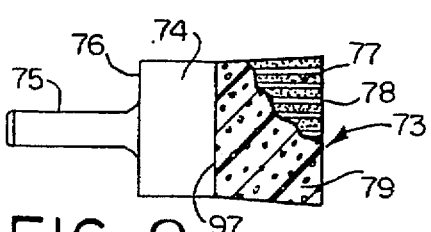
FIG. 8 is a similar view of an end-brush like tool in accordance with the present invention.

The tool shown generally at 73 in FIG. 8 is generally similar to but smaller than the cup brush of FIG. 7 and includes a cup element or hub 74 which includes a stem 75 projecting from the base 76 of the hub. From the open cup project the abrasive monofilaments 77 generally parallel to each other with the tips forming circular work face 78. The entire tool is placed in a mold and the elastomer 79 is infused or injected into the tool to fill the interstices and form an annular integument or skin around the exterior of the projecting abrasive monofilaments. The tool is rotated on the axis of the stem and again the light density cellular matrix bond provides support for the filaments enabling such filaments to contain a larger amount of abrasive material and also controls the lateral deflection of such filaments. The tool of FIG. 8 is an excellent spot facing tool.

Figure 9:
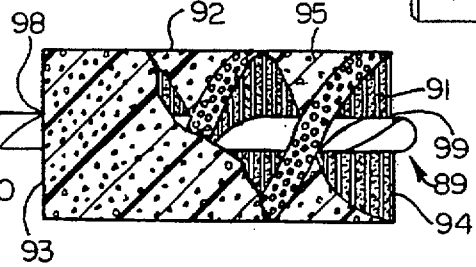
FIG. 9 is a similar view of flared cup brush-like tool also in accordance with the invention.

In FIG. 9, there is shown a tool generally at 81 which is made with the same cup 74 having stem 75 projecting from the base. The abrasive filaments, however, instead of extending substantially axially of the tool cup, extend at a significant axial angle as indicated at 82 forming a larger diameter work face 83, which is, however, still perpendicular to the axis of rotation. The tool 81 has a hollow center like the tool of FIG. 7 and the tool is formed by placing it in a mold enclosing the exterior 84, interior 85, and the tool face 83. The elastomer is then infused into the mold and foamed as indicated at 87.

Figure 10:
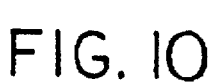
FIG. 10 is a similar view of a twisted stem tool encapsulated with a light density matrix in accordance with the present invention.

In FIG. 10, there is illustrated a tool shown generally at 89 which comprises a twisted stem wire 90 which captures a helical array of abrasive monofilaments 91 which project radially of the stem. Reference may be had to U.S. Pat. Nos. 5,404,681 and 5,329,730 for examples of such twisted stem tools. With the present invention, the twisted stem tool is formed with abrasive plastic monofilaments having an excess of abrasives and then placed into a generally cylindrical mold which has a cylindrical surface outline 92 corresponding to the radial extent of the captured abrasive monofilaments 91. The cylindrical mold extends axially between its inner and outer ends 93 and 94, respectively, which may correspond to the axial extent of the helical array of abrasive plastic monofilaments. The low density elastomer is injected into the mold and foamed to produce the cylindrical block illustrated. The spiral or helical array of the tips at the cylindrical surface 92 is the working face tool. Depending on how tightly the tool is twisted, there may be a gap between adjacent turns of the helix as indicated at 95, where essentially no plastic abrasive monofilaments exist. The matrix cellular bond does, however, fill such space and also the interstices of the filaments at the helix. The high filament density of the present invention is, of course, only at the helix of the tool where the cellular matrix bond fills the interstices between the abrasive filaments.

Figure 11:
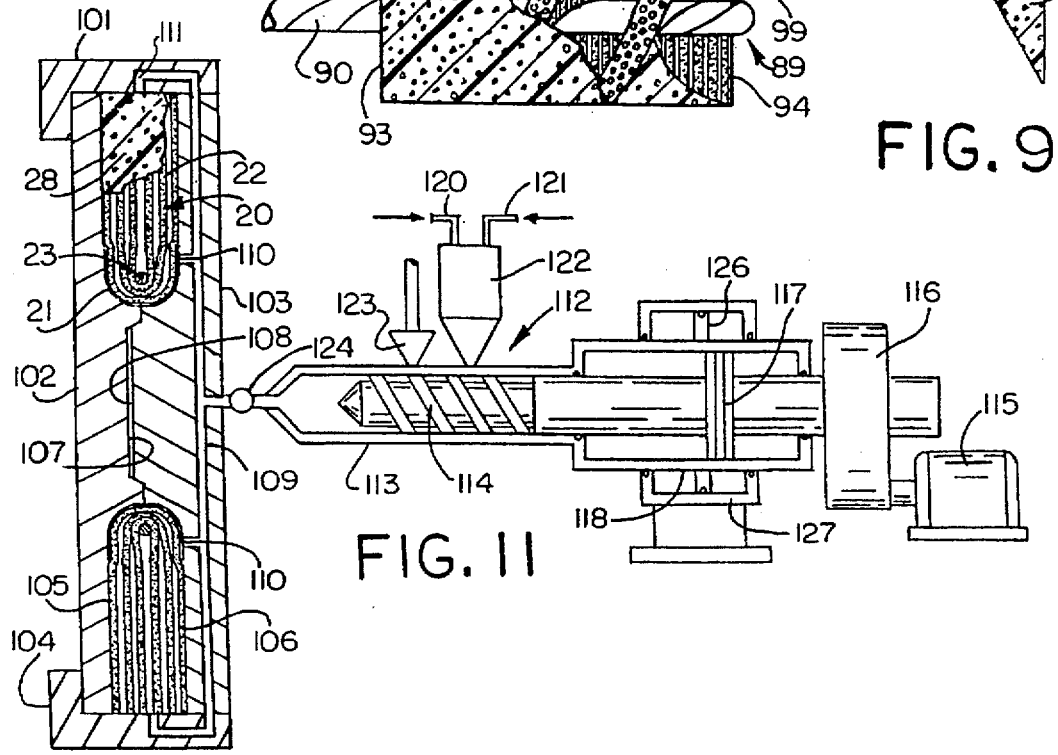
FIG. 11 is a schematic illustration of the matrix injection process which may concurrently form the coolant passages.

Referring now to FIG. 11, there is illustrated a process and apparatus schematically for making a disk tool in accordance with the present invention. Because the process is also forming the radially extending cooling passages in the disk tool, the molds illustrated in FIG. 11 enclose both the hub 21 and the array of plastic monofilaments extending therefrom. It is, of course, possible to encapsulate the tool of the type shown simply by enclosing the projecting abrasive monofilament so that the infused elastomer will penetrate the monofilaments within the hub. In such situation, the mold parts must seal against the hub or the hub rim. This rim is seen at 96 in FIG. 7, and at 97 in FIGS. 8 and 9. In FIG. 10, the cylindrical mold needs to seal against the twisted stem 90 as indicated at 98 and 99.

The mold tooling of FIG. 11 basically comprises three annular mold parts seen at 101, 102 and 103. The mold parts 102 and 103 are in the form of disks, while the mold part 101 is in the form of an L-shape ring. The short leg of the L indicated at 104 acts as a flange to seat the mold part 102. Both the ring 101 and the disk 102 may be fixed.

The disk type mold parts 102 and 103 both include a recess forming a cavity as seen at 105 and 106, such cavity including radially extending ridges which form the coolant passages 33 and 35, for example, when the mold parts 102 and 103 are pressed together. The mold parts 102 and 103 include an interfitting center pilot section which include pilot recess 107 in the mold part 102 and pilot projection 108 in the mold part 103. This limits the extent to which the mold parts may be closed and the pressure which can be placed upon the hub and the abrasive monofilaments therein.

The mold part 103 includes a runner system seen at 109 which communicates with infusion ports 110 in the side wall of the hub 21. The runner system may also extend to circumferentially spaced ports 111 to infuse the elastomer through the tool face. The elastomer is injected into the mold or infused into the tool by the reciprocating screw injection mixing machine shown generally at 112. The machine includes a barrel 113 in which a screw 114 rotates driven by motor 115 through transmission 116. The screw is reciprocated within the barrel through piston 117 moving in cylinder 118. The components of the elastomer system enter the barrel at 120 and 121 through hopper 122. Additional additives, such as coupling agents or fine abrasive, may be included at 123. When the components are properly mixed, the shutoff valve 124 is open and the screw is forced to the left as seen in FIG. 11 injecting the elastomer into the mold under significant pressure.

In the embodiment seen in FIG. 11, the entire machine is mounted for movement with the mold part 103 and the mold part is closed by the piston 126 moving in fixed cylinder 127 to open and close the mold system. It is the piston 126 which provides the pressure to form the radially extending coolant passages. The same system, but with different mold configurations, may be used to infuse the elastomer into the tools of the configuration seen in FIGS. 7–10.

The Abrasive Monofilaments

The bundle or array 22 may comprise plastic abrasive loaded filaments or monofilaments having a circular or rectangular transverse cross-section. Typically, a rectangular monofilament at its major flat face may be approximately 0.090 inch wide and about 0.045 inch thick. If circular in section, the diameters may vary. The larger diameters would be on the order of the dimensions set forth above to produce a similar cross-section area. The smaller circular cross-sections may be as small as 500 denier, for example. Also circular in section, plastic abrasive monofilaments may be crimped which tends to increase the intersticial space in the bundle.

The monofilament may be extruded plastic impregnated throughout uniformly with an abrasive mineral such as aluminum oxide, fused aluminum oxide, alumina, zirconia or silicon carbide. A wide variety of other abrasives may be included such as cubic boron nitride, sand, pumice, garnet, corundum, boron carbide, and fused or sintered alumina. Other more exotic abrasive minerals may readily be employed such as polycrystalline diamond. Also, the abrasive grit size may be varied from coarse to fine powders, the later being useful for extra fine polishing and highlighting effects.

The plastic material preferably has a Young's modulus greater than 0.10 at $10^6$ psi and more preferably greater than 0.40 at $10^6$ psi. Young's modulus is defined as the amount of force a material can undergo without permanent deformation when the force is removed. This is a measure of elasticity or the relationship of stress over strain.

The preferred plastic for extrusion of the monofilament working element is nylon. The preferred nylon is 6/12 nylon. Nylons are long-chain partially crystalline synthetic polymeric amides (polyamides). Polyamides are formed primarily by condensation reactions of diamines and dibasic acids or a material having both the acid and amine functionality.

Nylons have excellent resistance to oils and greases, in solvents and bases. Nylons have superior performance against repeated impact, abrasion, and fatigue. Other physical properties include a low coefficient of friction, high tensile strength, and toughness. Useful mechanical properties of nylon include strength, stiffness and toughness. In general, the greater the amount of amide linkages, the greater the stiffness, the higher the tensile strength, and the higher the melting point. Several useful forms of nylon are available and include:

A. Nylon 6/6 synthesized from hexamethylenediamine (HMD) and adipic acid;

B. Nylon 6/9 synthesized from HMD and azelaic acid;

C. Nylon 6/10 synthesized from HMD and sebacic acid;

D. Nylon 6/12 synthesized from HMD and dodecanedioic acid;

E. Nylon 6 synthesized from polycaprolactam;

F. Nylon 11 synthesized from 11-aminoundecanoic acid;

G. Nylon 12 synthesized from polyaurolactam; and others.

Nylons useful in the present invention have a Young's modulus greater than 0.05, preferably greater than 0.1 and preferably greater than 0.2.

The preferred nylon is nylon 6/12. The physical properties of nylon 64/12 include a melting point of 212° C., a dry yield strength at $10^3$ psi of 8.8 (7.4 at 50% RH), a dry flexural modulus of 295 (180 at 50% RH). Nylon has a higher Young's modulus (0.40 at $10^6$ psi) than rubber (0.01 at $10^6$ psi), which demonstrates the greater stiffness of nylon over an elastomer such as rubber, for example. As an example, a working element according to the present invention several feet long when held horizontally at one end at room temperature would show little or minimal deflection at the opposite end.

Nylon is partially crystalline, hence has little or no rubbery regions during deformation. The degree of crystallinity determines the stiffness and yield point. As the crystallinity decreases, the stiffness and yield stress decreases. Rubber, on the other hand, is an amorphous polymer and its molecular straightening leads to a low modulus of elasticity.

Nylon has a tensile strength of over 8000 psi, rubber has a tensile strength of 300 psi. Nylon exhibits 250% breakage during elongation, rubber exhibits 1200%. Nylon has fair moisture resistance, yet rubber absorbs a large amount of water. Nylon has excellent resistance to oil and greases and other organic solvents, rubber has extremely poor resistance. Nylon retains its properties from −75° F., to 230° F., while rubber has a narrow range around room temperature. Nylon's increased strength, resistance to moisture and solvents, and its wide usable temperature range make it the preferred material for this construction.

Another type of polyamide useful in the present invention include other condensation products with recurring amide groups along the polymer chain, such as aramids. Aramids are defined as a manufactured fiber in which at least 85% of the amide (—C(O)—N(H)—) linkages are attached directly to two aromatic hydrocarbon rings. This is distinguished from nylon which has less than 85% of the amide linkages attached directly to the two aromatic rings.

The plastic material may also be aramid fibers which are characterized by high tensile strength and high modulus. Two aramids that may be useful in the present invention include fiber formed from the polymerization of p-phenylenediamine with terephthaloyl chloride and a less stiff polymer formed from the polymerization of m-phenylenediamine and isophthaloyl chloride.

Aramids demonstrate a very strong resistance to solvents. Aramids have tensile strengths at 250° C. that are exhibited by textile fibers at room temperature. Also, some thermoset polymers are useful. Polyesters are an example and are long chain synthetic polymers with at least 85% of a dihydric alcohol ester (HOROH) and terephthalic acid (p-HOOCC$_6$H$_4$COOH). Polyester fibers contain both crystalline and non-crystalline regions. Polyesters are resistant to solvents and demonstrate a breaking elongation of 19 to 40%.

Polyimides are polymers containing (CONHCO) and are also useful in the present invention. High temperature stability (up to 700° F.) and high tensile strength of 13,500 psi make polyimides useful as binders in abrasive wheels.

The amount or percentage of abrasive in the monofilament is larger than would ordinarily be the case without the supporting cellular elastomeric matrix bond. Without the bond, an upper limit of from about 20 to about 30 percent provides for optimum tool wear and work efficiency. Higher amounts tend to shorten tool life, and with large expensive tools, shorter tool life has many economic disadvantages which far offset any short term increase in efficiency. This is particularly true in primary metal finishing. With the present invention, the abrasive loading can be increased significantly and achieve longer tool life. It is preferred that the loading be in excess of 25 percent and loading as high as 55 percent is achievable. Above such figures, the monofilament is costly to extrude and the tool and monofilament is difficult to form and handle.

Cellular Elastomer Matrix Bond

The preferred cellular elastomer is a somewhat flexible low density polyurethane. The elastomer should bond to the plastic of the abrasive monofilaments and the high abrasive loading of such monofilaments facilitates that bond. A coupling agent may be incorporated in the mixture to ensure such bond, although polyurethanes are noted for their adhesive characteristics. The cellular reinforcing matrix bonds not only to the filaments but to the metal of the hub. The interior mold surfaces are, however, treated or sprayed to release the tool when cured. The flexibility of the matrix bond should be such as to import to the monofilaments a compliance of about ⅛ inch to about one inch trim length, for example, even though the actual trim length is much greater, and maintain that compliance as the tool wears. With such compliance limitation and discipline, an excellent straight line scratch pattern is provided, particularly for primary metal finishing and edge blending.

The density of the cellular matrix bond is from about 2 to about 20 lbs/cu/ft, and preferably from about 4 to about 16 lbs/cu/ft. Such density is properly characterized as a light density. Urethane foams can vary from about 1.2 to about 60 lbs/cu/ft. When the cellular structure wears away, it will disintegrate quickly into mostly gas and will not normally pass into a liquid state.

The preferred polyurethanes are available as a two component liquid system which enter the process system at 120 and 121 and are coblended, or mixed by the rotating screw 114. The two components are usually a toluene diisocyanate and a hydrogen donor, usually high molecular weight polyethers. Typically, one component is about 0.9 to in excess of 1.5 equivalents of selected diisocyanate with one equivalent of a dihydroxy terminated polyester or polyether whose molecular weight is above about 500 to about 4000. It is common to use stoichiometric excesses of the diisocyanate component to provide required curing. In this invention, it is preferred to react 1.05 equivalents of selected diisocyanate with one equivalent of a dihydroxy terminated polyester or polyether. Plasticizers, including octyl alcohol terminated polypropylene adipates of about 2000 to about 5000 molecular weight from 2 to 20% may be used to soften polyurethanes and may be used to control flexibility.

The density of the foam is controlled with the use of water as the blowing agent, although water may be used in combination with other blowing agents. However, ozone damaging chlorinated hydrocarbons are to be avoided.

In addition to the coupling agents mentioned, other additives may be the usual surfactants providing a uniformity of small cell size, and catalysts. Extenders or other fillers are generally to be avoided, although a fine grit abrasive may be incorporated into the foam. The abrasive may be added at 123 in FIG. 11.

Some thermoplastic elastomers are useful. With the use of thermoplastic elastomers, the components are added as solids to the hopper 122 and the screw 114 becomes a plasticizing screw forming a low viscosity melt under high pressure. The barrel 113 may be heated to assist in forming the melt. A wide variety of blowing agents may be used. Examples are compressed air, nitrogen, carbon dioxide, or methylene chloride. It is desirable to avoid blowing agents with open flash points or chlorinated hydrocarbons.

Thermoplastic elastomers are polymeric materials having some characteristics of thermoplastics and some characteristics of elastomer. Accordingly, thermoplastic elastomers may be melted, subjected to processing and cooled and reformed like thermoplastics while having the elasticity properties of elastomers. The polymers consist of hard regions or domains and soft region or domains. The hard regions generally comprises low equivalent weight polyfunctional monomers whereas the soft region is generally comprised of high equivalent weight polyfunctional monomers. The melting temperature of the soft region is generally less than the melting temperature of the hard region. In addition, chain extenders such as ethylene, diamine or 1,4-butanediol are used to increase the hard segments and therefore hard domain size. The high equivalent weight soft regions form flexible chains connecting the low equivalent weight hard regions.

The flexible characteristics of the foam elastomer will depend on the amount and composition of the hard regions and soft regions present in the thermoplastic elastomer. Specific examples of useful thermoplastic elastomers along with the particular monomers used to prepare the soft and hard regions follow.

(1) Polyester thermoplastic elastomers.
  Soft: poly(tetramethyleneoxide)
  Hard: poly(tetramethyleneterephthalate)
(2) Polyether block amide (PEBA) thermoplastic elastomers
  Hard: polyamide blocks
  Soft: polyether blocks
(3) Polyurethane thermoplastic elastomers
  Hard: 4,4'-diphenylmethanediisocyanate (MDI) with a chain extender 1,4-butanediol
  Soft: polyether or polyester chains, specifically hydroxy terminated polyether or polyester chains.

Accordingly, the preferred cellular elastomers are polyurethanes which are nonthermoplastic, thermoplastic polyurethanes, polyethers, and polyesters. Again, coupling agents, surfactants and other additives may be included to provide the density and elastomer qualities to the foam to provide the advantages noted above.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

What is claimed is:

1. A method of making an abrasive tool comprising the steps of forming an abrasive tool by securing a bundle of abrasive monofilaments each containing a high ratio of abrasive homogeneously throughout to a rotatable hub, enclosing the hub and monofilaments at least partially in a mold, and injecting a foamable elastomer into the mold, foaming the elastomer to an extent to provide the tool with a light density elastomeric cellular matrix bond having a density of from about 2 to about 20 pounds per cubic feet, said density being low enough to avoid a rotary liquid phase upon wear at normal operating rotary speeds and pressures, and acting as an adhesive and providing support and limiting individual flexing of said monofilaments while further securing said monofilaments to the hub, and removing the tool from the mold.

2. A method as set forth in claim 1 wherein said abrasive monofilaments have an abrasive loading in excess of about 30%, and said foamable elastomer is abrasive free.

3. A method as set forth in claim 1 including the step of enclosing the hub and monofilaments in a mold under substantial pressure to form in said tool substantial cooling passages leading to the working face of the tool.

4. A method as set forth in claim 1 wherein said abrasive monofilament have an abrasive content in excess of about 30 percent.

5. A method as set forth in claim 1 wherein said foamed elastomer has a density of from about 4 to about 16 lbs/cu/ft.

6. A method as set forth in claim 1 wherein said abrasive monofilaments are extruded nylon.

7. A method as set forth in claim 1 wherein said light density elastomeric cellular matrix bond is an open cell foam encapsulating the tool and providing lateral support for avoiding flexing fracture of abrasive monofilaments of said bundle.

8. A method as set forth in claim 1 wherein said hub is in the form of a cup and said monofilaments project generally axially of said cup and generally parallel to or at an angle to the axis of rotation of said cup.

9. A method as set forth in claim 1 wherein said hub is an axially extending twisted wire stem and said abrasive monofilaments project from said stem transaxially in a helical pattern.

10. A method as set forth in claim 1 wherein said tool is in the form of a disk having an axially wavy circumferential working face.

11. A method as set forth in claim 1 wherein said abrasive monofilaments contain an excess amount of abrasive, the abrasive loading content of each monofilament being greater than the loading which adversely affects the strength of the monofilament without the cellular matrix bond.

12. A method as set forth in claim 1 wherein said bundle of monofilaments has a high filament content with respect to said hub and when said bundle and said hub are enclosed in a mold, said bundle occupies in excess of 60 percent of the volume of said mold beyond said hub.

13. A method as set forth in claim 1 wherein said elastomeric material is a low viscosity material which is mixed and injected into the tool to fill any voids in the bundle, and curing said elastomer after formation of the cellular structure.

14. A method as set forth in claim, 1 wherein said elastomeric cellular matrix bond includes voids in excess of about 50% of the matrix.

* * * * *